Figure 1:
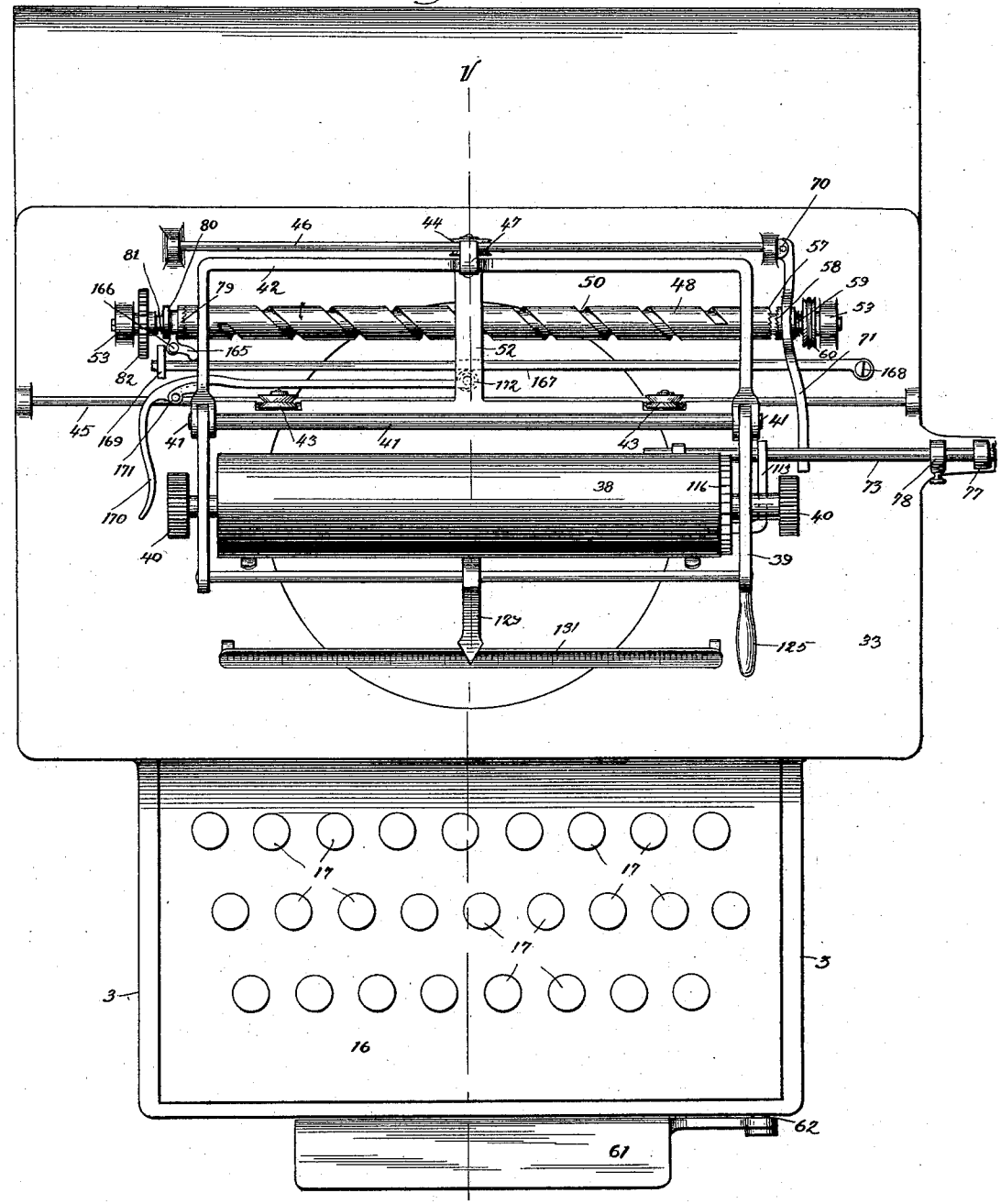

(No Model.) 9 Sheets—Sheet 2.

A. TEMPLETON.
AUTOMATIC TYPE WRITING MACHINE.

No. 580,654. Patented Apr. 13, 1897.

Witnesses:
H. B. Hallock.
A. A. Williamson

Inventor
Allison Templeton.
by Geo. H. Holgate
Attorney (No Model.)
9 Sheets—Sheet 3.

A. TEMPLETON.
AUTOMATIC TYPE WRITING MACHINE.

No. 580,654. Patented Apr. 13, 1897.

Witnesses:
H. B. Hallock.
S. S. Williamson

Inventor:
Allison Templeton
by Geo. H. Holgate
Attorney.

(No Model.) 9 Sheets—Sheet 4.
A. TEMPLETON.
AUTOMATIC TYPE WRITING MACHINE.
No. 580,654. Patented Apr. 13, 1897.
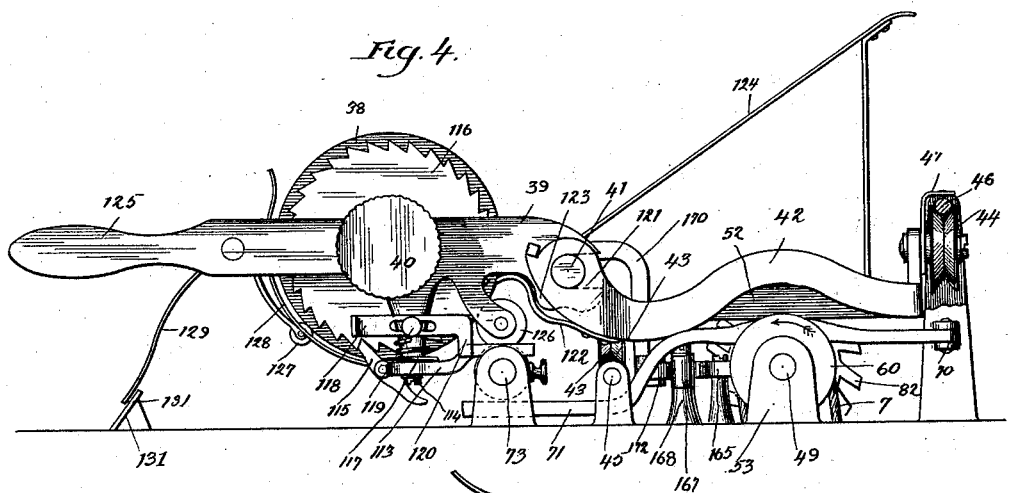
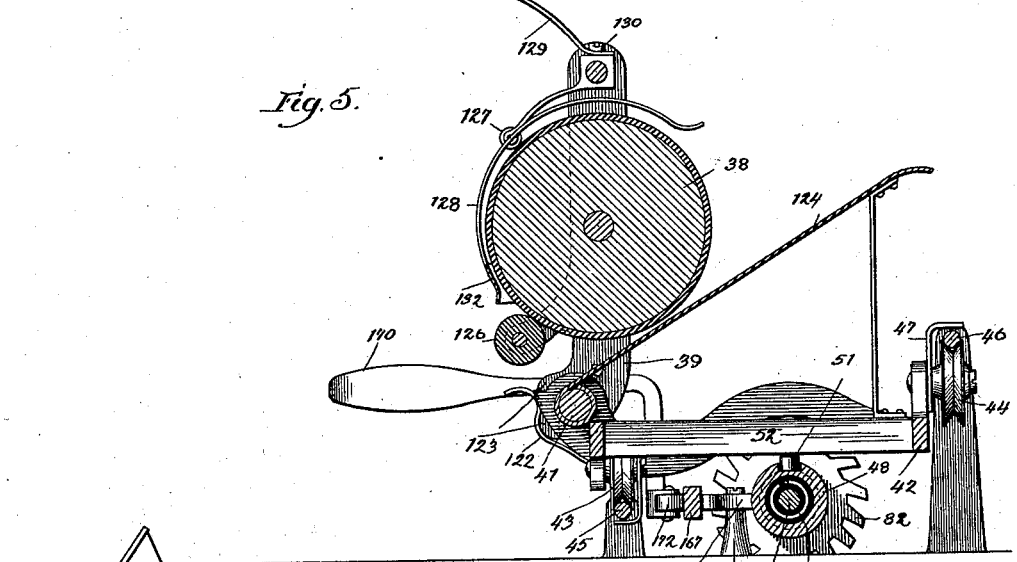
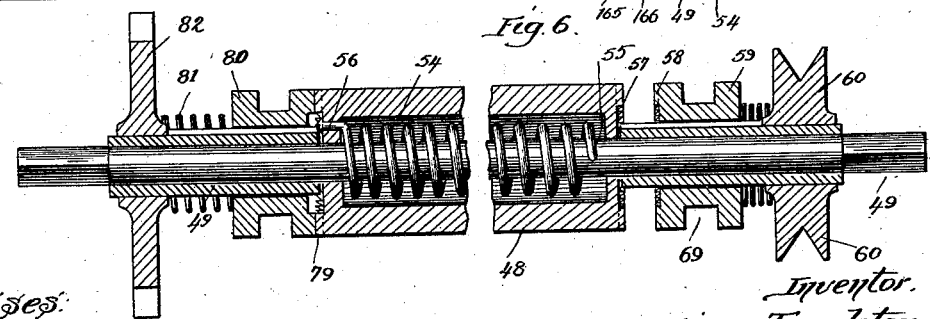
Witnesses:
H. B. Hallock.
S. H. Williamson.
Inventor.
Allison Templeton.
by Geo. H. Holgate
Attorney.

(No Model.)  9 Sheets—Sheet 5.
A. TEMPLETON.
AUTOMATIC TYPE WRITING MACHINE.
No. 580,654.  Patented Apr. 13, 1897.
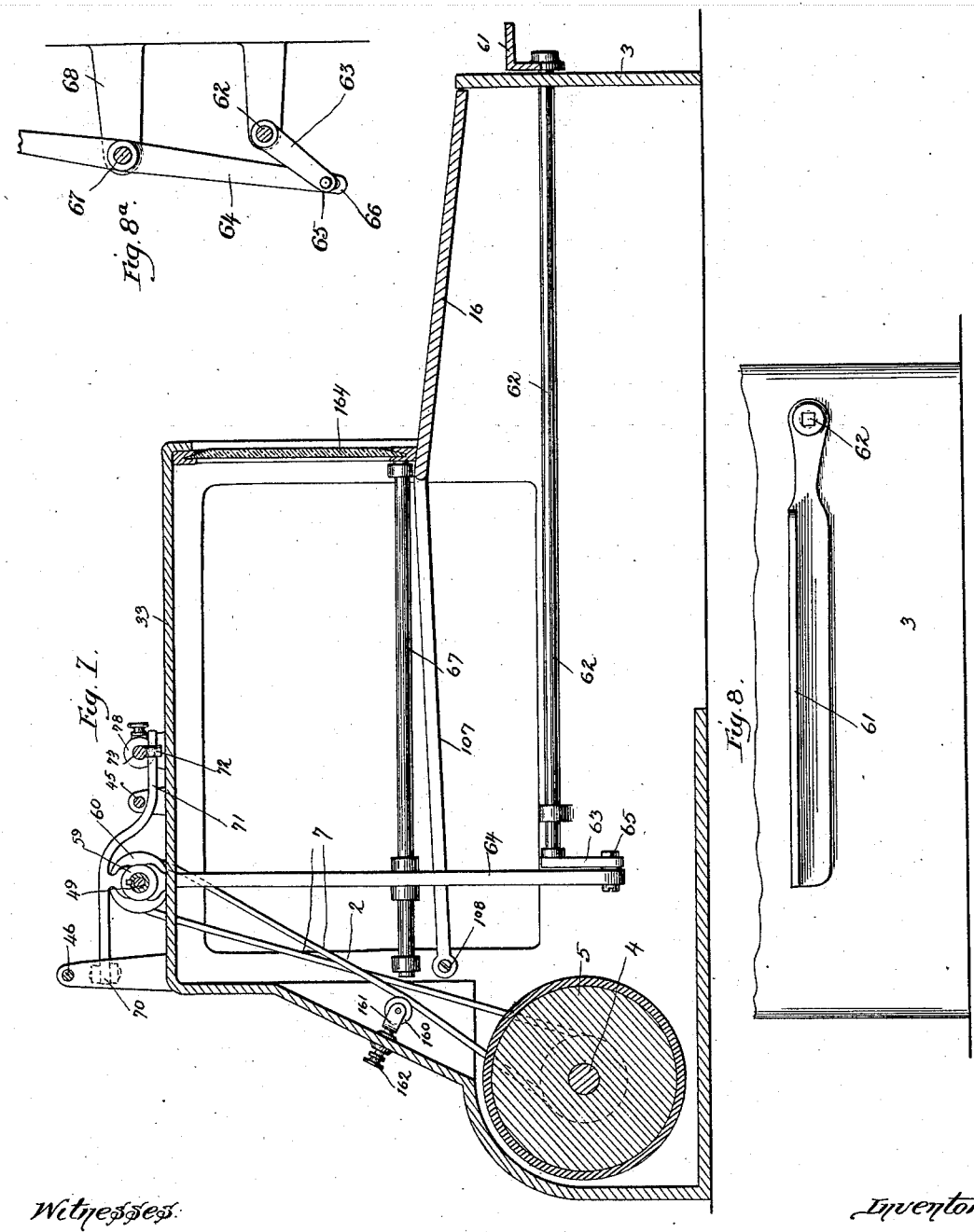
Witnesses:
H. B. Hallock.
S. J. Williamson
Inventor:
Allison Templeton.
By Geo. H. Holgate
Attorney.

(No Model.) 9 Sheets—Sheet 6.
A. TEMPLETON.
AUTOMATIC TYPE WRITING MACHINE.
No. 580,654. Patented Apr. 13, 1897.
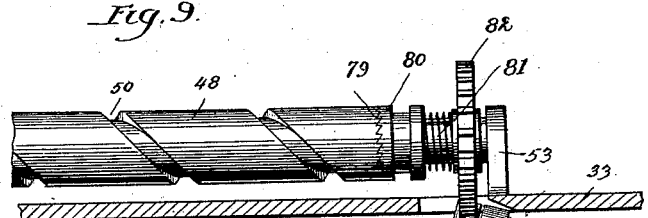
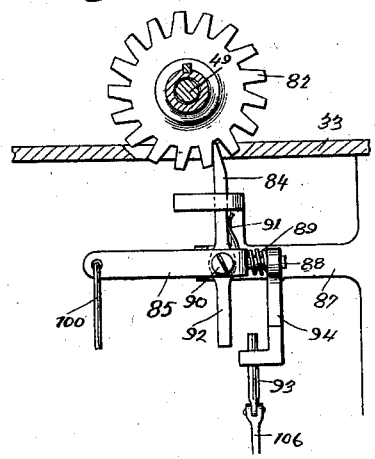
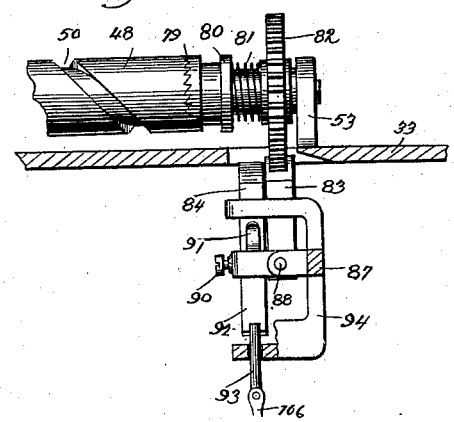
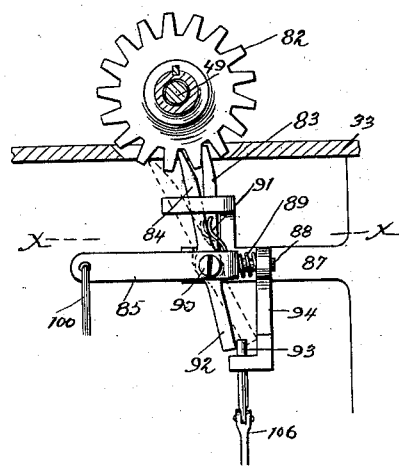
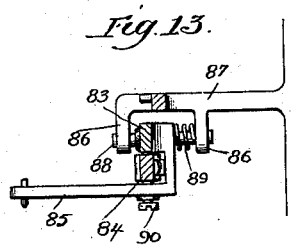
Witnesses:
H. B. Hallock.
S. J. Williamson.
Inventor:
Allison Templeton.
by Geo. H. Holgate
Attorney (No Model.) 9 Sheets—Sheet 7.
A. TEMPLETON.
AUTOMATIC TYPE WRITING MACHINE.
No. 580,654. Patented Apr. 13, 1897.
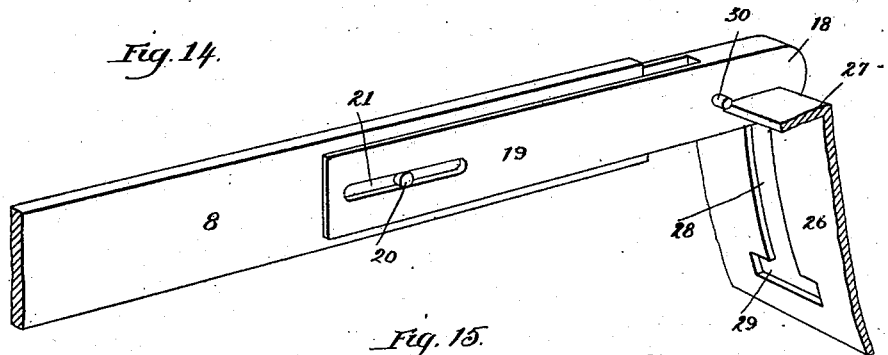
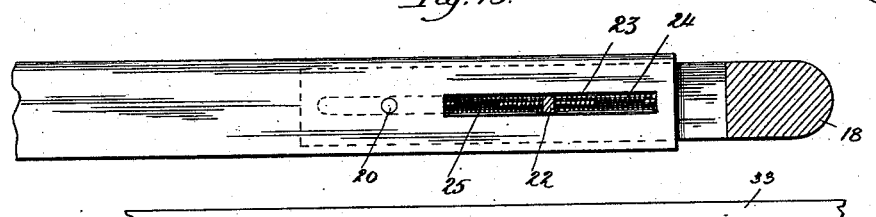
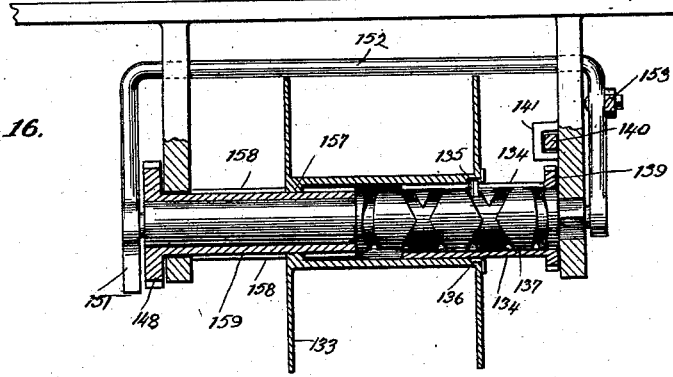
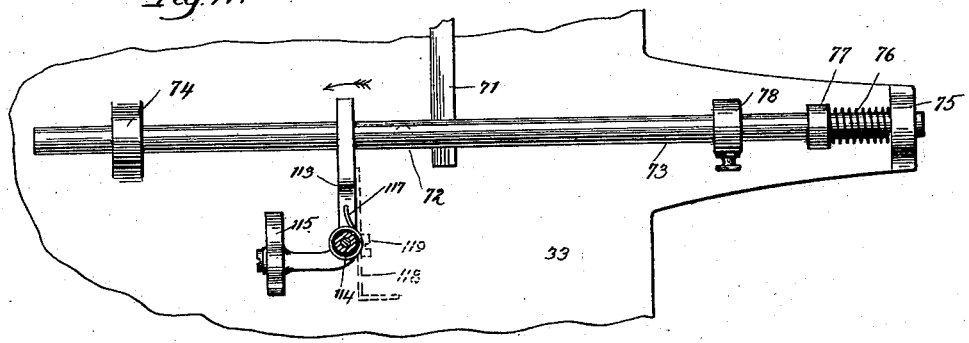
Witnesses:
H. B. Hallock.
J. J. Williamson.
Inventor.
Allison Templeton
by Geo. H. Holgate
Attorney

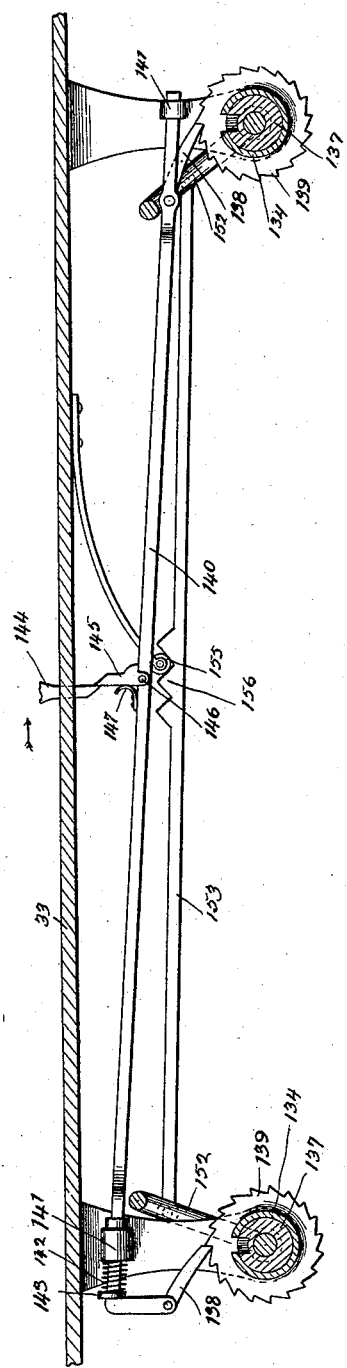

(No Model.)  
9 Sheets—Sheet 9.

A. TEMPLETON.
AUTOMATIC TYPE WRITING MACHINE.

No. 580,654. Patented Apr. 13, 1897.

Witnesses:
H. B. Hallock.
J. J. Williamson

Inventor:
Allison Templeton.
By Geo. H. Holgate
Attorney

UNITED STATES PATENT OFFICE.

ALLISON TEMPLETON, OF GALVESTON, TEXAS.

AUTOMATIC TYPE-WRITING MACHINE.

SPECIFICATION forming part of Letters Patent No. 580,654, dated April 13, 1897.

Application filed July 1, 1896. Serial No. 597,769. (No model.)

*To all whom it may concern:*

Be it known that I, ALLISON TEMPLETON, a citizen of the United States, residing at Galveston, in the county of Galveston and State of Texas, have invented a certain new and useful Improvement in Automatic Type-Writing Machines, of which the following is a specification.

My invention relates to a new and useful improvement in automatic type-writing machines, and has for its object to so construct a type-writer and organize its interdependent mechanisms as to cause their operations to be brought about automatically and by a power outside of the operator, it being only required that said operator lightly manipulate the keys to set the mechanisms in operation.

Another object of my invention is to save the time heretofore consumed in the reverse movement of the carriage and in turning the paper-roll to bring about the lining by having these several movements accomplished automatically by the depression of a single key.

Another object aimed at by my invention is to produce a differential spacing for the accommodation of the letters of varying widths.

Another object of my invention is to accomplish the spacing between words by the same movement of the same keys, which causes the striking of the type, thereby saving at least one-fifth of the time now lost in bringing about this spacing; and a further object of my invention is to automatically and without care or attention upon the part of the operator so manipulate the feeding of the inking-ribbon as to cause the use of its entire surface, thereby obviating the necessity and saving the expense of frequently changing said ribbon.

With these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 2:
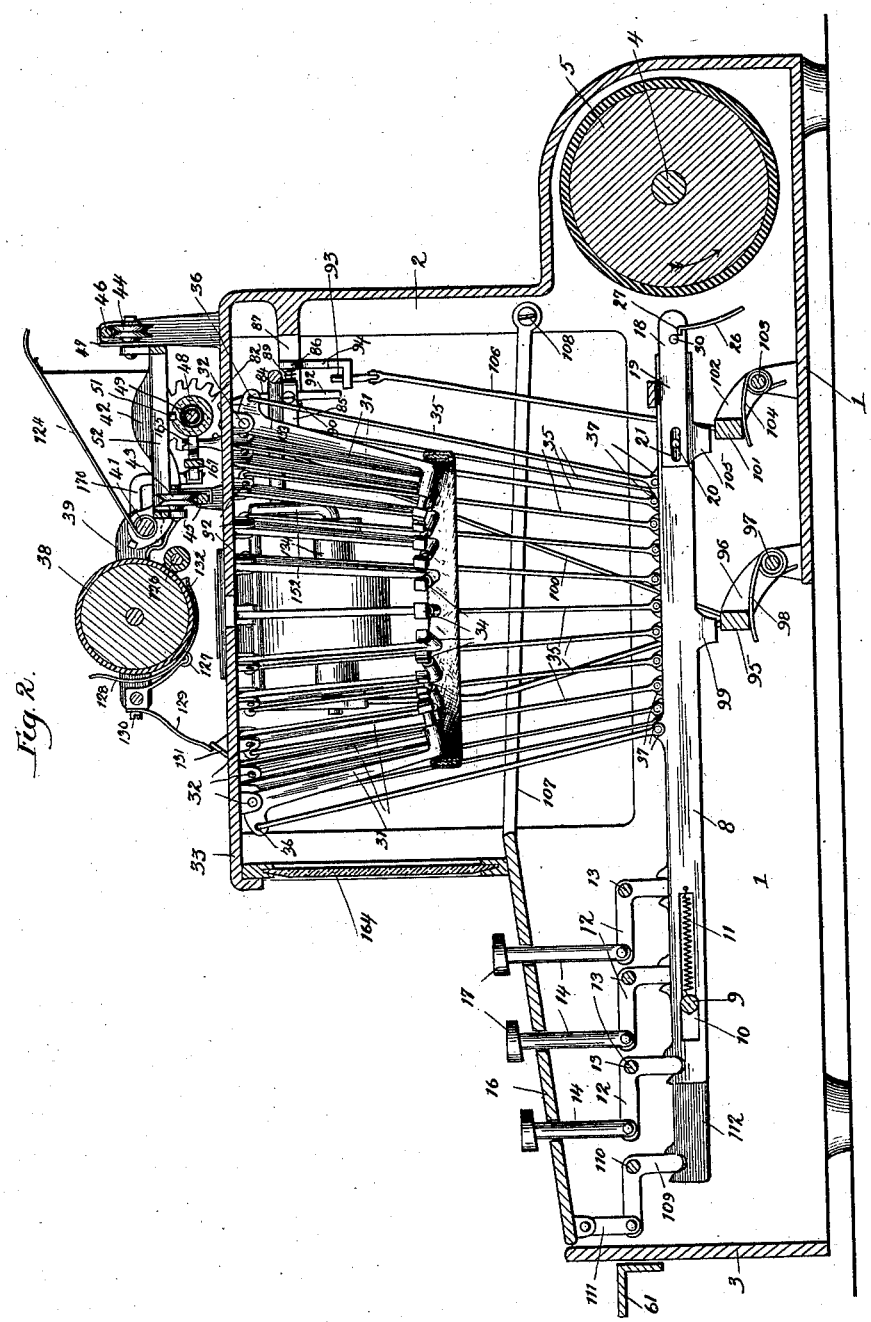
Figure 3:
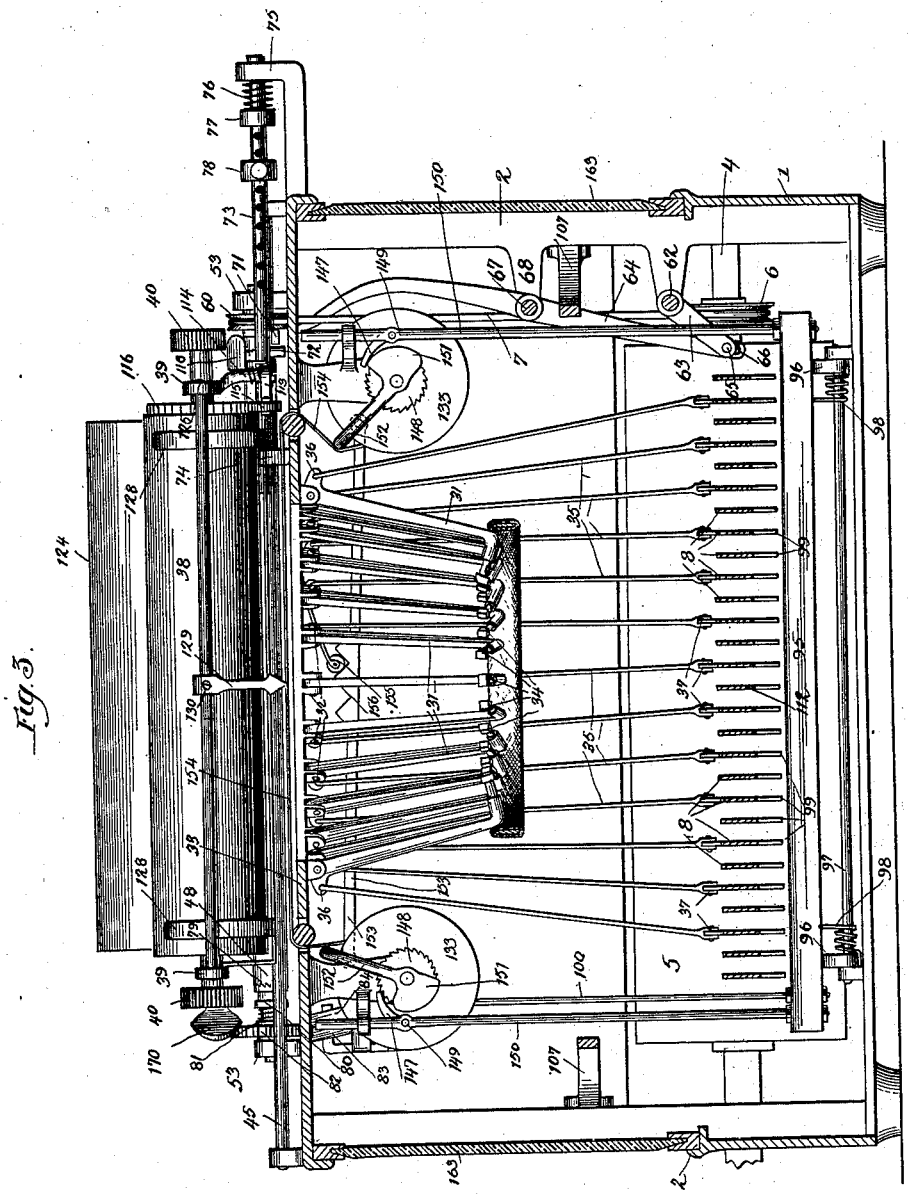
Figure 19:
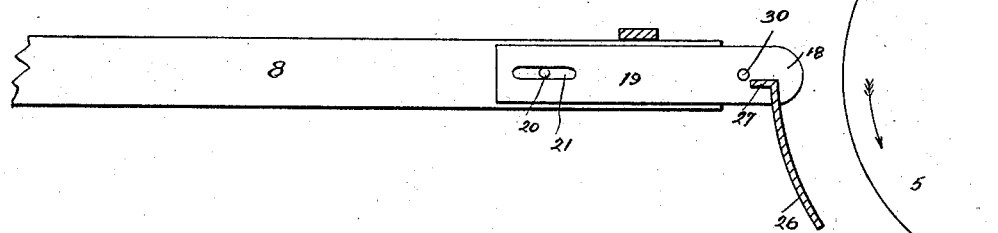
Figure 20:
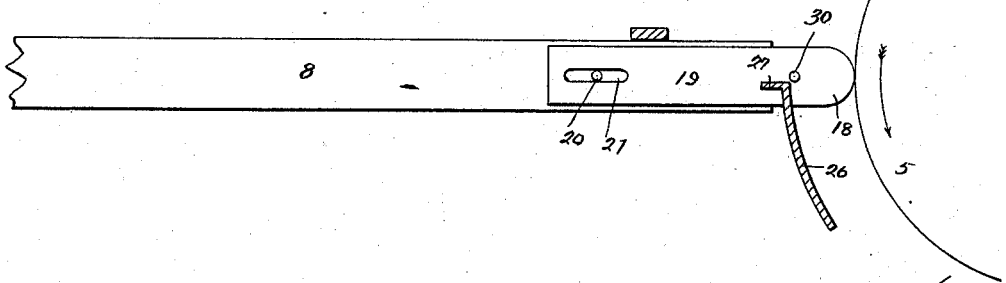
Figure 21:
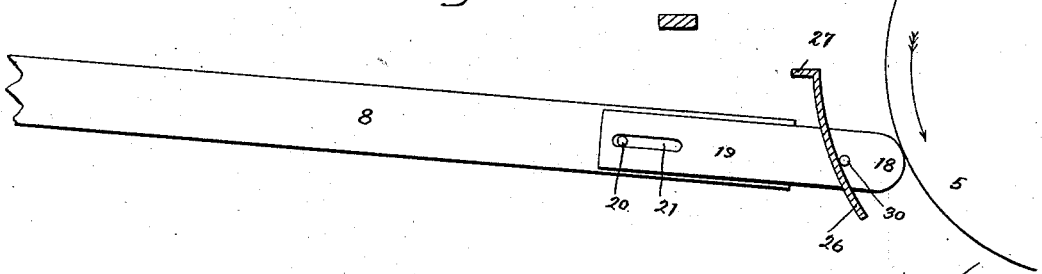
Figure 22:
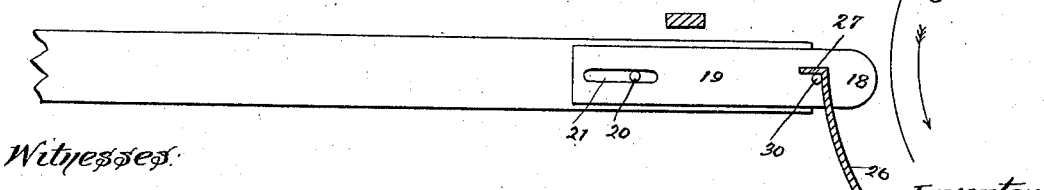

Figure 1 is a plan view of a machine built in accordance with my improvement; Fig. 2, a section at the line $v\,v$ of Fig. 1, the bar-pulley being in elevation; Fig. 3, a longitudinal vertical section of the frame and key-levers, the carriage and ribbon feeding mechanism being in elevation; Fig. 4, an enlarged end view of the carriage; Fig. 5, a cross-section of the same, the paper-roll being elevated to the position utilized in observing the last line written; Fig. 6, an enlarged broken-away longitudinal section of the feed-screw for operating the carriage; Fig. 7, a section similar to Fig. 2, but looking in an opposite direction, so as to show the key mechanism for bringing about the reverse movement of the carriage; Fig. 8, a section at the line $w\,w$ of Fig. 7, looking in the direction of the arrow. Fig. $8^a$ is a detail view of the clutch-lever and its connection with the rock-shaft; Fig. 9, a detail of a portion of the feed-screw and the escapement mechanism for bringing about the intermittent step-by-step movement of the carriage; Fig. 10, a similar view showing the pawls of the escapement mechanism in a different position; Fig. 11, an end view of this mechanism, showing the spring-actuated pawl in alinement with the rigid pawl; Fig. 12, a similar view showing the spring-actuated pawl in its normal position when a single-width space is to be had and also illustrating in dotted lines the position assumed by this pawl when a double-width space is to be had; Fig. 13, a section at the line $x\,x$ of Fig. 12; Fig. 14, a detail perspective of one end of a key-lever, showing the shoe in its normal position relative to the inclined surface before the lever has been forced forward by the depression of its key; Fig. 15, a vertical longitudinal section of Fig. 14, showing the connection between the shoe and the lever and the springs for permitting the two-way movement of said shoe. Fig. 16 is a detail section illustrating the means for bringing about the crosswise movement of the ribbon-spools; Fig. 17, a detail view of the clutch-rod for connecting the power to the feed-screw to return the carriage to the right-hand side of the machine, and also showing the pawl-lever, which is actuated by contact with the stop-collar upon this rod to revolve the paper-roll in bringing about the lining; Fig. 18, a detail of the ratchet mechanism for effecting the crosswise movement of the ribbon-spools; and Figs. 19, 20, 21, and 22, diagrams illustrating the several positions assumed by a key-lever before and after a key is depressed.

In carrying out my invention I provide a base 1, which may be of any approved design, here shown as rectangular and arranged to support the frame or casing 2, which in turn is adapted to contain and support the several operating parts of the machine, and formed with or secured to this base is an extension 3, of a size and shape adapted to accommodate the keyboard. Within the rear portion of the base is journaled a shaft 4, upon which is mounted a friction-drum 5, arranged to receive power from any suitable source, and a drive-pulley 6, adapted to transmit motion by the belt 7 to the feed mechanism upon the upper portion of the casing, as hereinafter set forth.

A series of key-bars 8 are arranged horizontally within the base and extension, so as to slide lengthwise, and are held in place by a rod 9, passing through the slots 10, formed in said levers, and are also held in their normally-retracted position by the springs 11, the outer ends of which are attached to the rod and the inner ends to the levers, as clearly shown in Fig. 2, a suitable stop being arranged to determine the normal elevated position of said levers. A series of right-angled levers 12 are pivoted at 13 within the extension 3 and correspond in number to the number of key-bars, and are so arranged that the vertical member of each of the levers fits within a suitable socket formed in these bars, so that when the horizontal member of the lever is depressed the bar will be forced rearward against the action of its spring 11, as will be readily understood by reference to Fig. 2, and in order that the right-angled levers may be operated the stems 14 are pivoted thereto at 15 and, extending upward, pass through the board 16 and are provided with the keys 17, each of which is designated by a character upon its upper face corresponding to the type operated thereby.

The inner end of each of the key-bars is provided with a shoe 18, connected thereto by the bifurcated slide 19, which embraces the end of the bar and is held in place by the pin 20, secured in the bar and passing through the slots 21 in the slide, and also by the block 22, projecting from the slide through the slot 23 in said bar, and coil-springs 24 and 25 are interposed between the ends of the last-named slot and the block 22, so as to hold the shoe in a normally central position between the limits of its movements in either direction, and yet permit said shoe to be forced to these limits when occasion requires. A curved incline-plate 26 is arranged in front of the friction-drum 5 and has a ledge 27 thereon, which stands in a horizontal plane, and in this plate is formed a slot 28 for each of the shoes carried by the key-bars, and these slots are so located as to permit the downward passage of said shoes therein and have at their lower ends crosswise enlargements 29 for the freeing of the pins 30, which project from either side of the shoes. By this arrangement it will be seen that when a key is struck and its bar forced rearward the shoe carried by the latter will come in contact with the friction-drum, which is designed to revolve at a high rate of speed in the direction of the arrow marked thereon, and the friction between this drum and the shoe will draw the latter downward, thereby carrying the pin 30 to the rear of the plate 26, which will prevent the retraction of said shoe from out of contact with the roll, even though the key immediately thereafter be released. When the shoe has been carried downward to an extent to cause the pin 30 to register with the enlargement 29 of the slot 28, said pin will be drawn through this enlargement by the action of the spring 24, thereby freeing the shoe from contact with the drum and permitting the bar to move upward until the pin 30 comes in contact with the under side of the ledge 27, where, if the key has been held in its depressed position, the pin will remain, thereby preventing the shoe from returning into contact with the friction-drum, which would bring about a further depression of the bar 8; but when the key is released the spring 11 will draw its bar outward, permitting the pin 30 to pass beyond the ledge 27, when the bar will be free to move upward to its normal position.

The type-bars 31 are pivoted at 32 to a series of lugs projecting downward from the under side of the top plate 33 of the casing and are arranged in a circle, so that the type 34 upon each of the bars will be brought to the same position when said bars are swung to substantially a horizontal position, and each of these bars is connected to one of the key-bars 8 by a wire link 35, the upper end of which is pivoted at 36 to an angular extension of the type-bar and the lower end to a lug 37, formed upon the key-bar 8, so that when either of the key-bars is depressed, as just described, a corresponding type-bar will be swung upward and its type thrust against the under side of the platen-roll 38 or the paper contained thereon after the manner of the operation of the type-bars in type-writers of ordinary construction.

The platen-roll 38 is journaled in the swinging frame 39, so as to revolve therein, and upon the shaft to which the roll is secured are also secured thumb-knobs 40, by means of which the roll may be revolved by hand when occasion requires, and the frame 39, in which this roll is journaled, is pivoted at 41 to the carriage proper, 42, which latter is provided with the guide-rolls 43 and 44, adapted to travel upon the guide-rods 45 and 46, respectively, the former being two in number and adapted to travel upon the top of the rod 45, while the latter is arranged to travel upon the under side of the rod 46, and in order that the roll 44 may not be forced downward from out of contact with the rod 46 a clip 47 is secured to the carriage and projects over the top of the rod. Beneath the carriage is journaled the feed-screw 48 upon a stationary shaft 49, set in the bearings 53, which project upward from the surface of the top plate of the casing, and this screw consists of a cylinder having a groove 50 formed therein upon a steep pitch, and a lug 51, formed upon the under side of the cross-bar 52 of the carriage, projects into engagement with this groove, so that when the cylinder is revolved in either direction the carriage will be caused to travel crosswise of the machine from right to left or vice versa, as the case may be, and these movements of this cylinder are effected in the following manner:

The feed-cylinder is hollow and has located therein the spring 54, which is coiled about the stationary shaft 49, having one of its ends attached thereto at 55 and the other to the cylinder at 56, so that when the cylinder is revolved in the direction of the arrow marked thereon the spring 54 will be wound, after which its tension will be exerted to revolve the roll in the opposite direction, when the escapement, which will be hereinafter described, permits said revolving. Clutch-teeth 57 are formed upon one end of the feed-screw cylinder and adapted to be engaged by corresponding teeth 58, formed upon the movable member 59 of the clutch, which is adapted to slide upon the shank of the grooved pulley 60 and to receive its rotary motion therefrom, said pulley being connected by the belt 7 to the drive-pulley 6, so that when these teeth are brought into engagement the power transmitted through the belt will revolve the feed-screw cylinder in the direction of the arrow marked thereon, thereby not only winding the spring 54, but also moving the carriage to the right to bring it to the position for starting a new line, and to place the operations of the clutch under the control of the operator of the machine a key-lever 61 is arranged in front of the extension 3 and is secured to the rock-shaft 62, upon which is also secured the arm 63, and this arm in turn is connected with the clutch-lever 64 by a pin 65, projecting from the arm 63 into a slot 66 in said lever. The lever 64 is secured upon the shaft 67, journaled in the brackets 68, and the upper end of this lever is bifurcated and engages with the annular groove 69, formed in the movable member 59 of the clutch, so that when the key-lever 61 is depressed the clutch-lever 64 will be caused to force this member into engagement with the teeth 67 of the feed-screw cylinder, thereby causing the latter to revolve, as before described, and when the key-lever 61 is released and permitted to move upward by the action of a suitable spring the teeth 57 and 58 will be disengaged and the revolving of the feed-screw cylinder stopped.

To prevent the straining of the operating mechanisms of the machine, it is desirable that the teeth 57 and 58 shall be disengaged automatically when the carriage has reached the limit of its right-hand movement, which is accomplished by the pivoting at 70 of the lever 71 and providing the latter with a shoe adapted to fit within the groove 69 of the clutch 59 and extending said lever forward within the field of action of the lug 72, projecting from the buffer-rod 73, arranged to slide within the bearings 74 and 75, this rod being held in the position shown in Figs. 1 and 17 by the coil-spring 76, interposed between the bearings 75 and the collar 77. As the carriage moves to the right and comes in contact with the marginal stop-block 78 the spring 76 will be compressed by the longitudinal movement of the buffer-rod, and this movement will also bring the lug 72 into contact with the lever 71, which will disengage the teeth 57 and 58 by returning the movable member 59 to its normal position, which will also restore the key-lever 61 to its normal position, and should the finger of the operator be upon this key at the time of its restoration the operator will be thereby made aware of the fact that the carriage has reached the limit of its movement.

Upon the opposite end of the feed-screw cylinder from that on which the teeth 57 are formed are a series of teeth 79, with which mesh the teeth of the clutch 80, and these teeth are held in engagement by the coil-spring 81, the object of which is to prevent the retrograde movement of the feed-screw so long as the clutch is prevented from revolving upon the stationary shaft 49, and this is effected by the escapement mechanism, consisting of the ratchet-wheel 82, to whose shank is splined the clutch 80, the rigid pawl 83, and the pivot-pawl 84. The pawl 83 is formed with or secured to the escapement-lever 85, and this lever is pivoted between the ears 86, formed upon the bracket 87, by the pin 88 and is held normally in engagement with the teeth of the ratchet-wheel 82 by the spring 89, which is coiled about the pin, having one of its ends attached to one of the ears 86 and its opposite end attached to the escapement-lever, and this arrangement permits of the moving of the pawl 83 sidewise out of engagement with the teeth of the ratchet when the lever is drawn downward, as will be hereinafter set forth.

The pawl 84 is pivoted by the screw 90 to the escapement-lever and is normally held out of alinement with the pawl 83 by the spring 91, but forced into alinement therewith when in engagement with the teeth of the ratchet by the superior tension of the feed-spring 54, tending to revolve the escapement-ratchet, and the pawl 84 is so located relative to these teeth as to be in engagement therewith when the escapement-lever 85 is in its normally-elevated position, so that when said escapement-lever is drawn downward the rigid pawl 83 will pass into engagement with the tooth with which the pawl 84 is then in engagement before the latter passes out of engagement with said tooth, thereby continuing to hold the feed-screw against retrograde movement; but after the pawl 84 has passed out of engagement with the tooth of the ratchet it will spring forward into alinement with the next interdental space, so that when the escapement-lever is again permitted to move upward this pawl will enter said space, and after the pawl 83 passes out of engagement with the tooth by this movement of the escapement-lever the ratchet 82 will be permitted to move one tooth by forcing the pawl 84 into alinement with the pawl 83, as will be readily understood. The pawl 84 is limited in its swinging movement, so as to move through a distance equal to one of the teeth of the escapement-ratchet by its heel end 92 coming in contact with the pin 93, which slides in the bracket 94; but should this pin be withdrawn from out the field of travel of the heel end of the pawl it is obvious that said pawl would swing through a greater distance, and this swinging is arranged to carry its nose far enough to register with the second interdental space from that occupied by the rigid pawl 83, for the purpose and in the manner hereinafter set forth.

A cross-bar 95, carried by the short arms 96, which are pivoted at 97 within the base of the machine, is arranged immediately beneath the key-bars 8 and held in its normally-elevated position by the springs 98, and upon the under side of the bars 8 are placed lugs 99, arranged to strike against the cross-bar 95 when either of said key-bars is depressed, as before set forth.

A small wire rod 100 connects the bar 95 with the escapement-lever 85, from which it will be seen that upon the depression and elevation of either one of the key-bars 8 the escapement-lever will be drawn downward and again returned to its normal position, thereby permitting the feed-screw to revolve one step or a distance equal to one tooth of the escapement-ratchet 82, as before described. Also arranged immediately beneath the key-bars 8 is a cross-bar 101, carried by the short arms 102, which are pivoted at 103 within the base, and this cross-bar is held in its elevated position by the spring 104. Upon the under side of certain of the key-bars 8 are formed lugs 105, adapted to strike and force downward the cross-bar when either of said key-levers is operated, as before set forth, and as the cross-bar 101 is connected with the pin 93 by the small wire rod 106 it is obvious that the operation of either of the key-bars carrying a lug 105 will depress the pin 93, so as to remove the obstruction from the path of the heel end of the pawl 84, thereby permitting said pawl to swing forward sufficiently to bring about the movement of the feed-screw through two spaces or a distance equal to two teeth of the escapement-ratchet, as before described. Now as the key-bars which carry the lugs 105 are connected to the type-bars carrying such type as require a greater space—as, for instance, the "m" and "w" in the small letters and all of the capital letters with the exception of the "I"—it is obvious that the carriage will be moved two spaces instead of one when these key-bars are operated, thereby providing the proper spacing for these double-width letters.

As it is essential to leave a clear space between each word printed, means must be provided therefor, and I have here shown an arrangement which contemplates effecting this result by a single movement of the key which operates the last letter in each word, and its construction is as follows: The keyboard 16, through which the stems 14 of the keys pass, as before described, is provided with arms 107, which extend rearward and are pivoted to the casing at 108, so that said board may be swung downward upon these pivot-points, and it is preferably returned to its normally-elevated position by a suitable spring. (Not shown.) A right-angled lever 109 is pivoted within the extension at 110 and is connected by the link 111 with the keyboard, and its vertical member fits within a socket formed in the outer end of the bar 112, which is similar in all respects to the bars 8, and is also provided with a shoe corresponding to the shoes 18, so that when the keyboard is depressed this bar will be forced rearward, bringing its shoe into contact with the friction-drum and causing its operation, as before described, in connection with the bars 8, and as this bar is provided with a lug 99 it is obvious that when it is depressed it will operate the cross-bar 95, thereby bringing about a one-space movement of the carriage through the escapement mechanism, as before described.

Now it will be seen that when the last letter in a word is being printed by the depression of the corresponding key, it is only necessary to continue the downward movement of said key after it is in contact with the keyboard to force said keyboard downward, thereby bringing about the operations just described and causing a one-step movement of the carriage, with the result of producing a clear space between that letter and the first letter in the next word. It is to be noted that after a key has been depressed sufficiently to bring its key-bar 8 into contact with the friction-drum and said drum has brought about the downward movement of said bar and the latter been returned to the position shown in Fig. 22, where it is retained by the engagement of the pin 30 with the under side of the ledge 27, a further downward movement of the key to effect the depression of the keyboard will of necessity force the key-bar 8 still farther forward, and this is permitted by the coil-spring 25, and when the key is ultimately released this spring will return the shoe to its normally central position relative to the key-bar. It is also to be noted that the ledge 27 serves the purpose of holding the key-bar 8 in a partially-depressed position so long as the finger of the operator remains upon the key of said bar, thus preventing the latter from rising to its normal position and the shoe thereof returning again into contact with the friction-drum, the object of which is to prevent a further operation of the type-bar during the time that the spacing between the words is being effected by the depression of the keyboard, as will be readily understood.

In order to save the operator the time which would be necessary to revolve the platen-roll one or two steps, as the case may be, in accordance with the amount of spacing desired between the lines, a lever 113 is pivoted at 114 to the carriage, one member of which extends crosswise of said carriage and in line with the marginal stop-block 78, so that when the carriage reaches the position which has been predetermined for its stopping, to leave the proper margin upon the paper being printed upon this member of the lever will come in contact with the stop-block and by the movement of the carriage will be operated in the direction of the arrow next adjacent thereto. This will move the other member of the lever crosswise of the carriage, and as it carries the pawl 115 said pawl will operate the ratchet 116, which is rigidly secured to the platen-roll in the direction to properly move the paper for a new line of printing. When the carriage is again moved to the left in accomplishing the step-by-step feed, or for other purposes, the crosswise member of the lever 113 will be carried out of contact with the stop-block, so that it may be returned to its normal position by the spring 117, and this normal position is determined by the slide 118, adjustably secured upon the carriage by the thumb-screw 119, passing through a suitable slot within said slide, so that when a single space between the lines is desired the slide is moved inward so that its toe 120 serves as a stop to arrest the swinging movement of the lever 113 in the position shown in full lines in Fig. 17; but when this slide is drawn outward, so that its toe clears the lever 113, the latter will make a free movement, thereby putting the pawl 115 in position to operate two teeth of the ratchet 116, from which it will be seen that to return the carriage to its proper position upon the right-hand side of the machine and leave the paper upon the platen for spacing the lines it is only necessary to depress the key-lever 61, which, as before described, will connect the power with the feed-screw, thereby rapidly revolving said screw in the proper direction to bring about these movements without further attention upon the part of the operator.

Under some circumstances it is desirable to remove the platen and the paper carried thereby without disturbing the position of the paper relative to said platen, and this is accomplished by the swinging frame 39 being connected with the rod 41 by open bearings 121, and this frame is retained in position when placed upon said rod by the springs 122, which bear upon the projections 123, formed with said bearings. These springs also serve to hold the swinging frame in the position shown in Fig. 5, when the platen-roll is turned up for observing the last-printed matter, and when in this position the frame may be readily removed by an upward pull. In practice this is of great advantage, since several kinds of work may be had in hand at the same time, without interfering with the spacing or alinement thereof, by the use of several of these swinging frames, since it will then be only necessary to remove one frame and substitute another therefor, leaving the work in its exact relative position to the machine, so that when the frame is replaced for further operations the printing may be immediately started where it was left off.

A suitable apron 124 is supported by the carriage in any convenient manner for the support of the paper which is not coiled about the platen-roll, and for convenience a handle 125 may project from the swinging frame for its manipulation; also, suitable friction-rolls 126 and 127 are arranged to bear against the platen-roll 38, so as to hold the paper in contact therewith, and a shield 128 is arranged to guide the paper when being placed upon the platen-roll. A pointer 129 is secured to the swinging frame at 130 and projects into juxtaposition to the graduated scale 131 for the purpose of indicating the point at which the next letter will be impressed by observing the corresponding graduation upon the scale 132, as is well understood in type-writing machines.

133 are the ribbon-spools, which are rotatably mounted upon the sleeves 134 and connected thereto by the lugs 135, projecting into the annular grooves 136, formed in the hubs of said spools, so that the latter are held against lateral movement independent of the sleeves, but permitted to revolve upon said sleeves without affecting the same. These sleeves are in turn mounted upon the right and left hand cross-screw 137, with which engages the inner end of the lug 135, so that when said sleeve is revolved it will also be caused to travel laterally first in one direction and then returned in the opposite direction, as is well understood, and each of these sleeves is revolved by a pawl 138, engaging with the ratchet 139, carried by said sleeve, so that every time these ratchets are revolved the ribbon-spools will be shifted sidewise, thereby changing the position of the ribbon relative to the point at which the type come in contact with the platen-roll, which will expose a new surface of said ribbon to the action of the type.

The pawls 138 for revolving the ratchets 139 are actuated by the rod 140, to which these pawls are pivoted, and this rod is guided in the bearings 141 and held in its normal position by the spring 142, interposed between one of said bearings and the collar 143. Therefore when the projection 144 comes in contact with the detent 145 when moving in the direction of the arrow located adjacent thereto the rod will be operated against the action of its spring, thereby causing the ratchets to turn one tooth, and after the projection passes out of engagement with the detent, which takes place on account of the different planes in which said projection and detent travel, the spring will return the rod to its position, causing the pawls to take hold of new teeth upon the ratchets; but when the projection is moved in the opposite direction from that indicated by the arrow and comes in contact with the detent 145 said detent will be swung upon its pivoted point 146 against the action of the spring 147, thus permitting said projection to pass to the opposite side of said detent. Now as the projection 144 is carried by the carriage it is obvious that for every to-and-fro lengthwise movement of said carriage the ratchets will be turned one step, which, as before described, will shift the ribbon-spools a short distance sidewise, and as this sidewise movement of the ribbon has no positive connection with the lengthwise feeding of said ribbon and is not timed therewith the same surface of the ribbon will seldom be exposed to the action of the type, which will greatly increase the durability of the ribbon, as will be obvious to those skilled in the art to which this invention appertains.

The lengthwise feeding of the ribbon is accomplished by the pawls 147, engaging with the ratchets 148, and these pawls are pivoted at 149 to the rods 150, which in turn are attached at their lower ends to the cross-bar 95, so that for every operation of the keys these pawls are caused to move and one or the other thereof moves its ratchet one step. One or the other of the pawls is brought into operation and the remaining pawl thrown out of operation by the cams 151, which are provided with the arms 152, said arms being connected by the rod 153, and the cams being so timed relative to each other as to leave one of the pawls out of operation when the other pawl is permitted to pass into operation with the teeth of the ratchets. Thus, while both of the pawls are simultaneously reciprocated, but one will operate upon its ratchet at the same time. The arms 152 are bent at right angles, so that the horizontal members thereof lie crosswise of the ribbon 154 in such manner that when the ribbon is fully wound upon one of the spools and entirely withdrawn from the other spool the tension thereon will cause the arm working in conjunction with the empty spool to be swung upward, which will bring its pawl into operative position with the teeth of its ratchet and carry the opposite pawl out of operative position, thus reversing the feeding of the ribbon and causing the empty spool to coil said ribbon thereon while drawing it from the full spool, and the shifting of the arms is facilitated by the lock-pin 155, passing over the vertex of the V-shaped cam-point 156, so that when the tension of the ribbon has moved the rod 140 until said vertex has passed to the opposite side of the lock-pin said pin, being spring-actuated, will ride down one of the inclines of the cam-point and continue to move the rod in that direction. The same result will take place, but in an opposite direction, when the opposite arm is operated and the cam-point again passed under the spring-actuated lock-pin.

The intermittent step-by-step rotation of the ratchets 133 is imparted to the ribbon-spools by the engagement of the lugs 157 with the spline-grooves 158, formed in the shanks 159 of the ratchet-wheels, whereby the lateral travel of the spools is permitted during their rotation by said shanks. This arrangement permits of the lengthwise feeding of the ribbon independent of its crosswise movements, whereby these two movements have no positive relation one to another and do not therefore take place in time, the object of which has been hereinbefore set forth.

It sometimes becomes necessary to move the carriage independent of the escapement mechanism, and this is accomplished by the lever 165, which is pivoted at 166 and has one end projecting into engagement with an annular groove in the clutch 80, so that by operating this lever to throw the teeth of the clutch out of engagement with the teeth upon the feed-screw said screw will be free to revolve independent of the escapement mechanism, thereby permitting the movement of the carriage in either direction by hand, and for convenience in operating the lever 165 for the purpose just described a bar 167 is pivoted at 168 and extends lengthwise of the machine, having its free end guided by projecting through a slot in the lug 169, and this bar is so arranged relative to the lever 165 that the heel end of said lever bears against said bar at all times by the action of the spring 81. The bar in turn is operated by the hand-lever 170, which is pivoted at 171 and carries a roll 172, which bears against the bar 167, as clearly shown in dotted lines in Fig. 1, so that to release the clutch 80 from engagement with the feed-screw it is only necessary to push the hand-lever 170 inward, when this disengagement will be effected.

The tension of the belt 7, which serves to transmit power from the drive-pulley 6 to the clutch 59, may be varied by an idle-roll 160, carried by the fork 161, adapted to be adjusted by means of the thumb-screw 162. The object of this is to compensate for the variance in the length of the belt due to atmospheric changes as well as use, since it is essential that the tension of this belt shall be sufficient to properly drive the clutch when in engagement with the feed-screw, but to permit the slipping of the belt upon its pulleys when the motion of the clutch has been suddenly arrested without disengagement from said screw, thereby avoiding the strain which would otherwise come upon the parts of the machine.

All of the operating parts of the machine, with the exception of the carriage, may be incased in glass, so as to exclude dust and moisture and yet permit the observation of the working parts, and the manner of so inclosing the machine is illustrated at 163 and 164, where the sides and front of the casing are provided with glass sections, and this may be carried to any extent which fancy may elect.

From the foregoing description it will be seen that the only attention the operator is required to give the machine when writing thereon is concentrated upon the keys and the key-lever 61, as all the movements of the machine are brought about from the proper manipulation of these keys and this lever by the power which is transmitted thereto through the shaft 4, which latter may be revolved by any suitable motor, such as an electric or spring motor, and since the work is accomplished by this motor the necessity for striking the keys with considerable force is obviated, thereby facilitating the manipulation of the same, which will increase the rapidity of such manipulation without the strain upon the fingers of the operator now attendant upon the use of type-writers of ordinary construction; also, since the work is accomplished by the motor and the force of impact of the type may be varied by the proper adjustment of the shoes and their operating mechanism relative to the friction-drum, my improvement is especially adapted for manifold work and the type may be made to strike the paper with great force without increasing the force with which the keys must be depressed.

While my improvement has many advantages over the method of type-writing now used, the principal advantage to be gained is the increased speed of operation, and this is largely brought about by the decrease in the length of movement and force of touch usually necessary to operate the keys and from the fact that no time is lost in the manipulation of keys for spacing, the sliding of the carriage to the opposite side of the machine, or the turning up of the platen-roll to gain space for a new line, and another cause for the increase of speed in my improvement is that it is not necessary to release the last key struck before striking the next, and in practice a skilled operator may depress two or more keys, one after the other, by a dragging movement of the finger where said keys are located adjacent to each other without the possibility of the type-bars interfering with each other, since the operation of said bars and their release are automatically accomplished, regardless of the holding down of a key.

A further marked advantage of my improvement is that the force with which the type is driven against the paper or platen may be determined to a nicety, regardless of the force with which the keys are depressed by the operator, and this force of impact may be varied with the various type, so as to be in ratio to the face of said type, whereby a narrow-face type will be embedded in the paper to no greater depth than will be a wide-face type, thus producing a uniformity of printing, which is not possible where the force with which the key is depressed determines the force with which the type strikes the paper.

If it should be found desirable for certain classes of work, a type-writer may be built in accordance with my improvement having two, three, or four cross-bars similar to the cross-bar 101 and key-bars and keys provided for certain combinations of letters, such as "th," "the," "ion," "con," "ed," "ing," &c., and these key-bars, when provided with lugs 105, arranged relative to the cross-bars, which correspond to the number of spaces through which the carriage is to be moved, will depress the proper cross-bar when operated, and by the connection of these cross-bars with a series of pins corresponding to the pins 93, arranged in steps, the proper spacing will be provided for the reception of these combinations.

When a machine is thus arranged, words composed of any of the combinations of letters may be quickly written by the depression of a key for the printing of the combination and other single keys for the adding of the remaining letters, thus greatly increasing the speed with which the printing may be accomplished.

While I prefer to so arrange the friction-drum that it shall have a continuous revolution, it is obvious that it might be so arranged as to be revolved intermittently and mechanism provided for controlling these intermittent revolutions, so as to cause them to take place in unison with the depression of the key-bars, whereby the operations of the key-bars would be effected, and for some purposes this arrangement is advantageous, and especially when a spring-motor is used, since the power of said motor would not be spent in uselessly revolving said drum, which would necessitate the frequent winding of said motor.

Instead of utilizing longitudinally-moving key-bars it is obvious that the initial movement of the shoes may be brought about by the keys through a series of rock-levers or other suitable mechanism, and modifications might be made in the construction here shown without departing from the spirit of my invention, and I do not wish to be understood as limiting myself to the exact construction here described, as this may be varied in accordance with the requirements of the work to be performed and the design preferred by the manufacturer.

Having thus fully described my invention, what I claim as new and useful is—

1. In a type-writing machine, a series of key-bars adapted to move longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, and a suitable carriage whose movements are under control of the keys, substantially as shown and described.

2. In a type-writing machine, a series of key-bars adapted to move longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a keyboard for effecting the spacing between the words, and a suitable carriage whose movements are under control of the keys and keyboard, as shown and described.

3. In a type-writing machine, a series of key-bars adapted to move longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, and a suitable carriage whose movements are under the control of the cross-bar 95, substantially as shown and described.

4. In a type-writing machine, a series of key-bars adapted to move longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, an escapement connected with the cross-bar, a feed-screw which is spring-actuated in one direction and whose spring movements are under the control of the escapement, means for revolving the screw against the action of its spring by power outside of the operator, a key-lever for controlling this winding, and a suitable carriage whose movements are under the control of the feed-screw, substantially as and for the purposes set forth.

5. In a machine of the character described, a series of key-bars 8 arranged within the base of the machine and adapted to be moved longitudinally, levers 12 adapted to force said bars in one direction, springs for returning said bars to their normal position when released, stems 14 pivoted to the levers and projecting through the keyboard, keys carried by said stems, shoes carried by the inner ends of the bars 8, two coil-springs carried by each bar so arranged as to hold the shoes in a normally central position but permit their movement longitudinally in either direction relative to the bars when sufficient force is brought to bear thereon, a revolving friction-drum, an incline plate 26, and pins projecting from the shoes for engagement with said plate, said plate having slots formed therein for the passage of the shoes, substantially as and for the purpose set forth.

6. In a machine of the character described, the bars 8 fitted upon the rod 9, shoes 18 carried by said bars, springs 23 and 25 arranged to hold the shoes in a normally central position upon the bars but permit them being forced in either direction relative to the bars, pins carried by the shoes, a plate 26 having slots therein for the passage of the shoes, said slots being enlarged at their lower ends for the passage of the pins, a revolving friction-drum for engaging the shoes when forced inward, a ledge formed upon the plate for preventing the final upward movement of the bars 8 when held inward, levers 12 for forcing the bars 8 in one direction, springs 11 for returning said bars when the pressure thereon is released, and keys 17 connected to the levers 12 by the shanks 14, substantially as and for the purpose set forth.

7. In a machine of the character described, the bars 8 fitted upon the rod 9, shoes 18 carried by said bars, springs 23 and 25 arranged to hold the shoes in a normally central position upon the bars but permit them being forced in either direction relative to the bars, pins carried by the shoes, a plate 26 having slots therein for the passage of the shoes, said slots being enlarged at their lower ends for the passage of the pins, a revolving friction-drum for engaging the shoes when forced inward, a ledge formed upon the plate for preventing the final upward movement of the bars 8 when held inward, levers 12 for forcing the bars 8 in one direction, springs 11 for returning said bars when the pressure thereon is released, keys 17 connected to the levers 12 by the shanks 14, a bar 112 also fitted upon the rod 9 and carrying a shoe corresponding to the shoes 18, a lever 109 for operating said bar in one direction against the action of its spring, a board 16 connected to the lever 109, said board being so arranged as to be depressed by the proper manipulation of either of the keys, lugs 99 carried by the bars 8 and 112, a cross-bar 95 under control of said bars, and a suitable escapement mechanism operated by the bar 95, substantially as and for the purpose set forth.

8. In combination with the key mechanism of a type-writing machine of the character described, type-bars actuated by said mechanism, a carriage suitably mounted upon the framework of the machine, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, an escapement for controlling the movements of the ratchet, means under the control of the key mechanism for operating said escapement, and a platen-roll carried by the carriage, substantially as and for the purpose set forth.

9. In combination with the key mechanism of a type-writing machine of the character described, type-bars actuated by said mechanism, a carriage suitably mounted upon the framework of the machine, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, an escapement for controlling the movements of the ratchet, means under the control of the key mechanism for operating said escapement, a swinging frame pivoted to the carriage, a platen-roll journaled within said frame, and means carried by the frame for revolving the platen-roll by the movement of the carriage, substantially as and for the purposes set forth.

10. In a type-writing machine, a series of key-bars adapted to move longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a keyboard for effecting the spacing between the words, a carriage suitably mounted upon the framework of the machine, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, an escapement for controlling the movements of the ratchet, means under the control of the key mechanism for operating said escapement, a swinging frame pivoted to the carriage, a platen-roll journaled within said frame, and means carried by the frame for revolving the platen-roll by the movement of the carriage in one direction, substantially as and for the purposes set forth.

11. In a type-writing machine, a series of key-bars adapted to be moved longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, an escapement connected with the cross-bar, a carriage suitably mounted, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, a swinging frame pivoted to the carriage, a platen-roll journaled within said frame, and means carried by the frame for revolving the platen-roll by the movement of the carriage, substantially as and for the purposes set forth.

12. In combination with a type-writing machine, two spools adapted to carry the inking-rubber, sleeves on which the spools are mounted and a lug engaging the screw for moving the spools sidewise, substantially as described.

13. In combination with a type-writing machine, an ink-ribbon-feeding mechanism, comprising two spools for carrying said ribbon, sleeves upon which said spools are mounted, screws upon which the sleeves are mounted, said screws having a right and left cross-thread, pins 135 projecting into engagement with the threads of the screws, ratchets for revolving the sleeves, pawls for operating said ratchets, a rod 140 to which said pawls are pivoted, means carried by the carriage of the machine for actuating said rod, and means connected with the key mechanism for revolving the spools, substantially as and for the purpose set forth.

14. In combination with a type-writing machine of the character described, an ink-ribbon-feeding mechanism, comprising two spools, sleeves upon which said spools are mounted, double cross-threaded screws upon which said sleeves are mounted, said screws being held stationary, ratchets carried by the sleeves, pawls for actuating said ratchets, a rod 140 for actuating the pawls, means carried by the carriage of the machine for imparting motion in one direction to the rod, a spring for returning said rod to its normal position, ratchet-wheels 148 to whose shanks the spools are splined, pawls for actuating the last-named ratchets, means for connecting said pawls to the key mechanism, cams 151 for throwing the last-named pawls into and out of engagement with their ratchets, arms 152 so disposed relative to the ink-ribbon as to be controlled thereby, whereby the cams are operated, a rod 153 connected to said arms so as to cause the latter to move in unison, and means for locking said rod in two positions, substantially as and for the purposes set forth.

15. In a type-writing machine, a series of key-bars adapted to be moved longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, an escapement connected with the cross-bar, a carriage suitably mounted, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, a swinging frame pivoted to the carriage, a platen-roll journaled within said frame, means carried by the frame for revolving the platen-roll by the movement of the carriage, two spools adapted to carry the inking-ribbon, means for revolving said spools, double-threaded screws for moving said spools sidewise, sleeves mounted upon said screws, and means for revolving said sleeves, as specified.

16. In a type-writing machine, a series of key-bars adapted to be moved longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, an escapement connected with the cross-bar, a carriage suitably mounted, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, a swinging frame pivoted to the carriage, a platen-roll journaled within said frame, means carried by the frame for revolving the platen-roll by the movement of the carriage, an ink-ribbon-feeding mechanism, comprising two spools for carrying said ribbon, sleeves upon which said spools are mounted, screws upon which the sleeves are mounted, said screws having a right and left cross-thread, pins 135 projecting into engagement with the threads of the screws, ratchets for revolving the sleeves, pawls for operating said ratchets, a rod 140 to which said pawls are pivoted, means carried by the carriage of the machine for actuating said rod, and means connected with the key mechanism for revolving the spools, substantially as and for the purpose set forth.

17. In a type-writing machine, a series of key-bars adapted to be moved longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, and escapement connected with the cross-bar, a carriage suitably mounted, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, a swinging frame pivoted to the carriage, a platen-roll journaled within said frame, means carried by the frame for revolving the platen-roll by the movement of the carriage, an ink-ribbon-feeding mechanism, comprising two spools, sleeves upon which said spools are mounted, double cross-threaded screws upon which said sleeves are mounted, said screws being held stationary, ratchets carried by the sleeves, pawls for actuating said ratchets, a rod 140 for actuating the pawls, means carried by the carriage of the machine for imparting motion in one direction to the rod, a spring for returning said rod to its normal position, ratchet-wheels 148 to whose shanks the spools are splined, pawls for actuating the last-named ratchets, means for connecting said pawls to the key mechanism, cams 151 for throwing the last-named pawls into and out of engagement with their ratchets, arms 152 so disposed relative to the ink-ribbon as to be controlled thereby, whereby the cams are operated, a rod 153 connected to said arms so as cause the latter to move in unison, and means for locking said rod in two positions, substantially as and for the purposes set forth.

18. In combination with the carriage and feed mechanism of a type-writing machine of the character described, a clutch 80 whose rotations are controlled by the escapement mechanism, a lever for controlling the longitudinal movement of said clutch, a bar pivoted to the frame of the machine and adapted to operate said lever, and a hand-lever arranged to operate said bar, substantially as and for the purpose set forth.

19. In a type-writing machine, a series of key-bars adapted to be moved longitudinally, a series of levers for moving said bars in one direction, a series of springs for returning said bars to their normal position, a series of keys connected with the levers, shoes carried by the inner ends of the bars, a revolving friction-drum for depressing said bars when said shoes are forced in contact therewith, means for holding said shoes in contact with the drum until the limit of their downward movement is reached, means for retracting said shoes out of contact with the drum when this limit is reached, type-bars connected to the first-named bars so as to be operated by the latter, a bar 112 similar to the key-bars and carrying a shoe for contact with the friction-drum, a lever 109 for operating the bar 112, a keyboard 16 connected to said lever, said board being so arranged as to be depressed by either of the keys, a cross-bar 95, a series of lugs 99 carried by the key-bars and the bar 112 for depressing said cross-bar, and escapement connected with the cross-bar, a carriage suitably mounted, a feed-screw adapted to impart motion to said carriage, a spring for revolving the screw in one direction, a clutch for revolving the screw against the action of its spring, means for throwing said clutch into and out of engagement with said screw, a ratchet journaled concentric with the feed-screw, a clutch for connecting said ratchet with the screw whereby the latter may be revolved in one direction while the ratchet remains stationary, a swinging frame pivoted to the carriage, a platen-roll journaled within said frame, means carried by the frame for revolving the platen-roll by the movement of the carriage, an ink-ribbon-feeding mechanism, comprising two spools, sleeves upon which said spools are mounted, double cross-threaded screws upon which said sleeves are mounted, said screws being held stationary, ratchets carried by the sleeves, pawls for actuating said ratchets, a rod 140 for actuating the pawls, means carried by the carriage of the machine for imparting motion in one direction to the rod, a spring for returning said rod to its normal position, ratchet-wheels 148 to whose shanks the spools are splined, pawls for actuating the last-named ratchets, means for connecting said pawls to the key mechanism, cams 151 for throwing the last-named pawls into and out of engagement with their ratchets, arms 152 so disposed relative to the ink-ribbon as to be controlled thereby, whereby the cams are operated, a rod 153 connected to said arms so as to cause the latter to move in unison, means for locking said rod in two positions, a clutch 80 whose rotations are controlled by the escapement mechanism, a lever for controlling the longitudinal movement of said clutch, a bar pivoted to the frame of the machine and adapted to operate said lever, and a hand-lever arranged to operate said bar, substantially as and for the purpose set forth.

In testimony whereof I have hereunto affixed my signature in the presence of two subscribing witnesses.

ALLISON TEMPLETON.

Witnesses:
S. S. WILLIAMSON,
MARK BUFORD.